United States Patent
Kim et al.

(10) Patent No.: US 6,550,569 B2
(45) Date of Patent: Apr. 22, 2003

(54) METHOD FOR OPERATING ELECTRIC POWER STEERING SYSTEM OF AUTOMOBILE

(75) Inventors: Seong Joo Kim, Kyonggi-do (KR); Seong Kyu Kim, Seoul (KR); Dai Jong Chung, Kyonggi-do (KR); Wan Seop Kim, Kyonggi-do (KR)

(73) Assignee: Mando Corporation (KR)

( * ) Notice: Subject to any disclaimer, the term of this patent is extended or adjusted under 35 U.S.C. 154(b) by 0 days.

(21) Appl. No.: 09/995,841

(22) Filed: Nov. 20, 2001

(65) Prior Publication Data
US 2002/0092700 A1 Jul. 18, 2002

(30) Foreign Application Priority Data
Nov. 24, 2000 (KR) .......................................... 2000-70194

(51) Int. Cl.⁷ ................................................. B62D 5/04
(52) U.S. Cl. ............................ 180/446; 701/42; 701/48
(58) Field of Search ................................. 180/443, 446; 701/41, 42, 48

(56) References Cited
U.S. PATENT DOCUMENTS 5,729,107 A * 3/1998 Shimizu et al. ............. 180/446
6,032,757 A * 3/2000 Kawaguchi et al. ......... 180/446
6,059,068 A * 5/2000 Kato et al. ................... 180/446
6,223,847 B1 * 5/2001 Shimizu et al. .............. 180/446
6,367,577 B2 * 4/2002 Murata et al. ............... 180/446

\* cited by examiner

Primary Examiner—Lesley D. Morris
Assistant Examiner—Matthew Luby
(74) Attorney, Agent, or Firm—Anderson Kill & Olick, P.C.; Eugene Lieberstein; Michael N. Meller

(57) ABSTRACT

A method for operating an automobile electric power steering (EPS) system is provided. Whether or not the automatic adjustment of the steering angle is performed is decided based on a speed of the automobile and a rotational state of each wheel. A cooperative steering angle to cooperate a braking state of the automobile is set based on the decision and the speed of the automobile. A target steering angle is determined to adjust the steering angle based on the cooperative steering angle and a manual steering angle; and a feedback control on the steering angle is performed such that the steering angle of each wheel become to close to the determined target steering angle.

3 Claims, 3 Drawing Sheets

METHOD FOR OPERATING ELECTRIC POWER STEERING SYSTEM OF AUTOMOBILE

FIELD OF THE INVENTION

The present invention relates to an electric power steering (EPS) system of an automobile; and, more particularly, to an operational method of an EPS system capable of reducing a yawing moment of the automobile by selectively adjusting steering angles of wheels depending on an operational state of an anti-lock brake system (ABS).

BACKGROUND OF THE INVENTION

An anti-lock brake system (ABS) operates to increase or decrease hydraulic pressure applied to wheel cylinders of wheels when an automobile brakes. By such operations of the ABS, a cornering force suitable for maintaining an effective steering action and a slip ratio having a largest frictional coefficient capable of minimizing a braking distance for stopping can be obtained.

In general, the ABS comprises wheel speed sensors for detecting rotational speeds of the wheels, each wheel speed sensor being installed at respective front wheels and rear wheels of the automobile, ABS actuators installed at a pipe line between a master cylinder and wheel cylinders so as to adjust a braking power by decreasing or increasing a braking hydraulic pressure within each wheel cylinder, and an ABS electronic control unit (ECU) for controlling the ABS actuators and the wheel speed sensors.

First, the ABS ECU calculates a speed of the automobile by using a rotational speed of each wheel generated by each wheel speed sensor and simultaneously detects a rotational state of each wheel. Then, the ABS ECU commands the ABS actuator to increase or decrease the braking hydraulic pressure to obtain an optimum braking power suitable for a road surface condition. In other words, when a frictional force between a left tire and a road surface is different from that between a right tire and the road surface (split-$\mu$), the ABS ECU controls the braking hydraulic pressure to prevent a risk that might occur due to a lock phenomenon of the wheels. FIG. 3A shows an automobile which is revolved due to a yawing moment generated by a difference in the road frictional forces of the left and the right tires.

When a driver suddenly brakes an automobile on a slippery road, the driver tends to hastily steer the automobile for the purpose of preventing a slippage thereof. Accordingly, the automobile is often over-steered, thereby causing a danger for the driver.

As a solution to this problem, a steering effort required to steer the automobile is increased in a conventional EPS system to make a steering response smaller than that of the normal case. The EPS system is widely used to control the current of the steering motor such that the steering effort for obtaining a specific steering result may be attained. Thus, the EPS system makes it possible that a driver can turn a vehicle by operating a steering wheel with a small steering effort, wherein the steering wheel can be operated with a small steering effort when the vehicle is idling or travels at a low speed, whereas a larger steering effort is required when the vehicle travels at a relatively high speed.

However, when road frictional coefficients of the left and the right tires are different from each other in the conventional EPS system, even a larger steering effort won't remove a risk of accident. Moreover, if an inexpert driver confusedly misses a steering wheel, it is highly likely that an automobile may be slid away from a road to cause an accident.

SUMMARY OF THE INVENTION

It is, therefore, an object of the present invention to provide a method for operating an automobile EPS system capable of reducing a yawing moment of an automobile by automatically adjusting a steering angle according to a braking state of the automobile and thus allowing the automobile to move linearly even when the automobile suddenly brakes on a road surface where a left and a right tire of the automobile have different road frictional coefficient.

In accordance with the present invention, there is provided a method for operating an automobile electric power steering (EPS) system capable of selectively adjusting a steering angle depending on a braking state of an automobile, comprising the steps of:

making a decision about whether or not the automatic adjustment of the steering angle is performed based on a speed of the automobile due to the braking state and a rotational state of each wheel;

setting a cooperative steering angle to cooperate the braking state based on the speed of the automobile and decision about whether or not the automatic adjustment of the steering angle is performed;

determining a target steering angle for the automatic adjustment based on the cooperative steering angle and a manual steering angle of a steering wheel; and performing a feedback control on the cooperative steering angle such that the steering angle of said each wheel becomes close to the determined target steering angle.

BRIEF DESCRIPTION OF THE DRAWINGS

The above and other objects and features of the present invention will become apparent from the following description of preferred embodiments given in conjunction with the accompanying drawings, in which.

DESCRIPTION OF THE INVENTION

Figure 1:
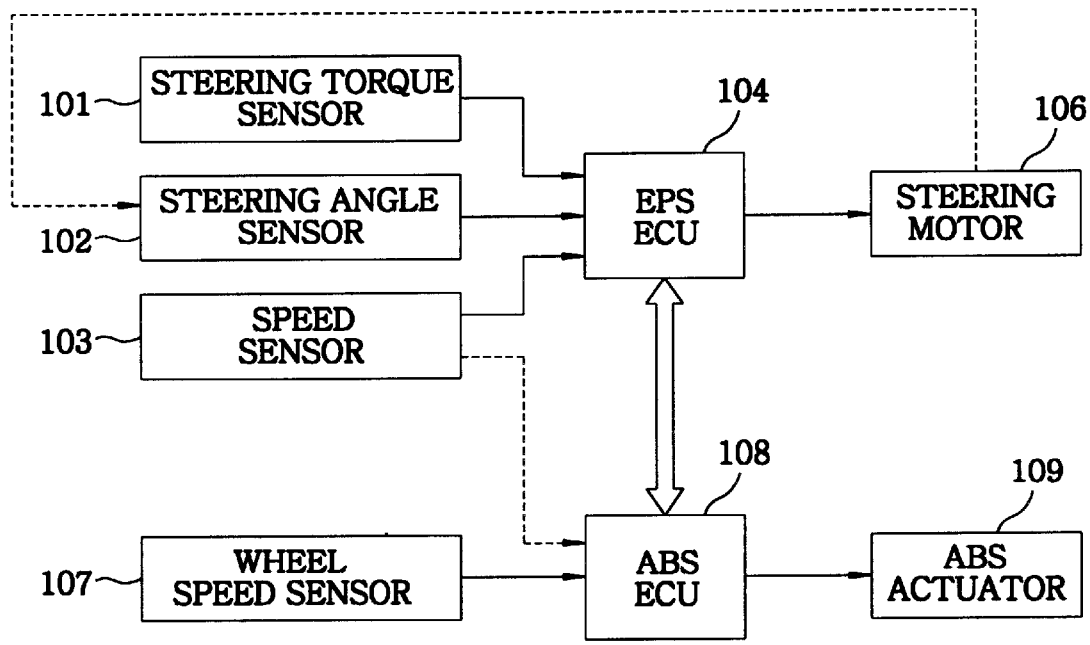
FIG. 1 is a block diagram of an automobile electric power steering system operating module in accordance with the present invention.
Figure 2:
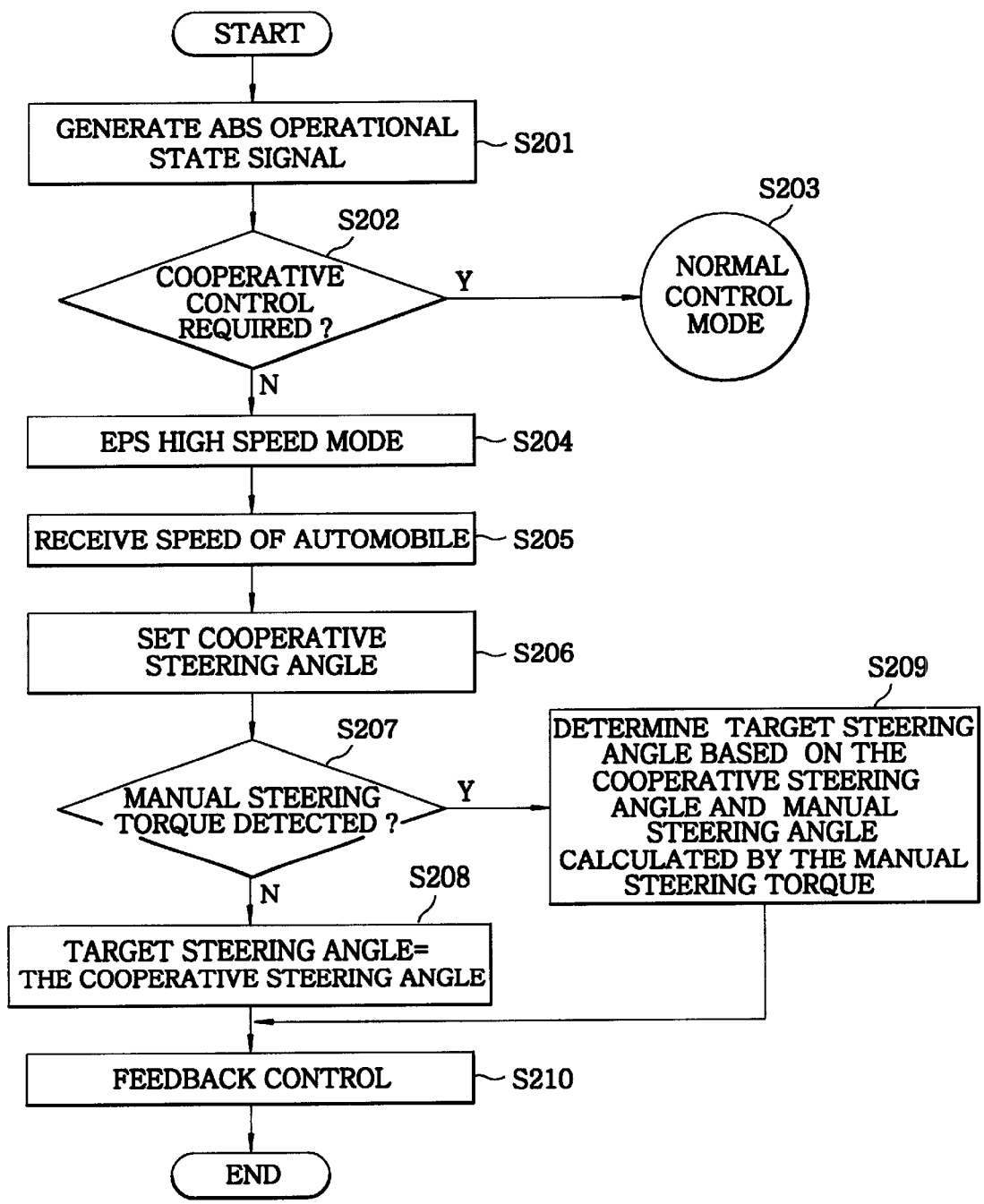
FIG. 2 depicts a flow chart illustrating an automobile electric power steering system operating process in accordance with the present invention.
Figure 3A:
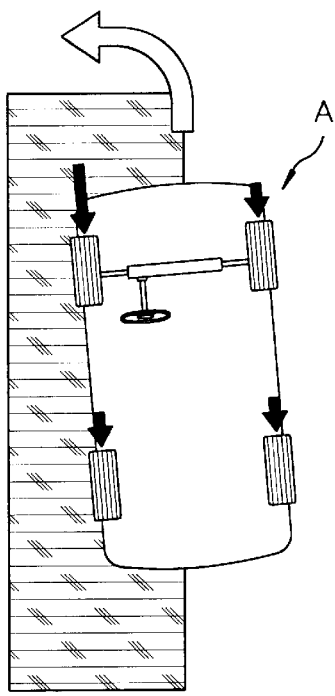
FIG. 3 shows an operational example of the automobile electric power steering system operating process in accordance with the present invention.
Figure 3B:
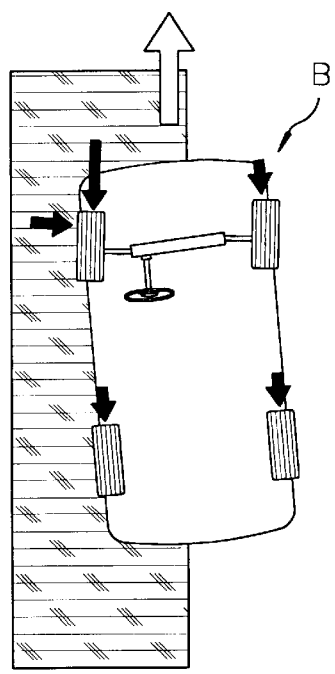

Referring to FIG. 1, there is provided a block diagram of an automobile EPS system operating module in accordance with the present invention.

The EPS system operating module comprises a steering torque sensor 101, a steering angle sensor 102, a speed sensor 103, an EPS ECU 104, a steering motor 106, wheel speed sensors 107, an ABS ECU 108 and an ABS actuator 109.

The steering torque sensor 101 detects a manual steering torque corresponding to a variation of steering angel. The steering angle sensor 102 calculates a manual steering angle of a steering wheel by detecting a position of the steering motor 106. The speed sensor 103 detects a speed of an automobile.

The wheel speed sensor 107 is installed at each of front and rear wheels of the automobile to detect a rotational speed of each of the front and the rear wheels.

An ABS actuator 109 is installed at a pipe line between a master cylinder and each of wheel cylinders to control a braking power by increasing or decreasing a braking hydraulic pressure within each wheel cylinder.

The ABS ECU 108 computes the speed of the automobile by using the rotational speed of each of the wheels detected by the wheel speed sensors 107 and concurrently detects rotational states of each of the wheels. Then, the ABS ECU 108 commands the ABS actuator 109 to increase or decrease the braking hydraulic pressure so as to obtain the optimum braking power for a road surface condition.

The EPS ECU 104 generates a target command for motor current, i.e., a target command for steering angle, by using the manual steering torque detected via the steering torque sensor 101, the manual steering angle detected via the steering angle sensor 102 and the speed of the automobile detected via the speed sensor 103. Specifically, the target command for motor current depends on the speed of the automobile and may be generated by superposing an angle command due to a difference between a target steering angle and the manual steering angle with a torque command due to the manual steering torque applied by a driver as will be described hereinafter.

The steering motor 106 generates a torque in response to the target command for steering angle. The torque is amplified by a steering gear (not shown) to be used to adjust the steering angle of the wheels.

An EPS system operating process conducted by the EPS system operating module as described above will be described hereinafter.

First, when a driver put on a brake of the automobile, the ABS ECU 108 operates the ABS actuator 109 by using the wheel speed signals detected by the wheel speed sensors 107 to thereby brake the automobile, and then generates an ABS operational state signal to the EPS ECU 104 (Step 201).

The ABS ECU 108 determines whether or not a cooperative control with the EPS is required depending on the speed of the automobile and the rotational speeds of the wheels and generates the ABS operational state signal based on such determination (Step 202).

The ABS operational state signal includes information on a braking environment of the automobile, i.e., the friction coefficient difference of the road surface. Referring to Table 1, there is shown an example of state information flag lists in case the cooperative control is required.

TABLE 1

| | Variable | State Information |
|---|---|---|
| Bit 0 | Assist Demand | Cooperative control required |
| Bit 2 | YMR | Split $\mu$ |
| Bit 4 | FL_HIGH | Front Left road surface High $\mu$ |
| Bit 6 | FR_HIGH | Front Right road surface High $\mu$ |

The EPS ECU 104 may be operated either in a normal control mode (Step 203) or in a cooperative control mode (Steps 204 to 210) depending on the ABS operational state signal. In the cooperative control mode, the steering effort may be increased as an EPS high speed mode since amount of the assist current in the cooperative control mode should become smaller than that in the normal control mode (Step 204).

When a current speed of the automobile is inputted from the speed sensor 103, the EPS ECU 104 determines whether or not the ABS ECU 108 is used to perform an automatic steering angle adjustment and sets a cooperative steering angle depending on the ABS operational state signals and the current speed of the automobile so as to enhance the braking state of the automobile (Steps 205 to 206). For example, if FR_HIGH is inputted, i.e., if the right road surface friction coefficient is determined to be larger than that of the left road surface, the ABS ECU 108 may set the cooperative steering angle counterclockwise so as to allow the automobile to direct leftwise and, if otherwise, the ABS ECU 108 may set the cooperative steering angle clockwise so as to allow the automobile to direct rightwise.

If the driver performs a steering operation, the steering operation may be detected as the manual steering torque by the steering torque sensor 101, and signals detected by the steering torque sensor 101 are transmitted to the EPS ECU 104 (Step 207).

In case there is detected no manual steering torque, the cooperative steering angle set in Step 206 is determined to be the target steering angle (Step 208).

If otherwise, i.e., if there is detected the manual steering torque, the EPS ECU 104 produces an assistant current for controlling the steering motor 106 based on the manual steering torque detected by the steering torque sensor 101 and then superposes the assistant current with a control current of the steering motor 106 to generate the target steering angle(Step 209).

The EPS ECU 104 calculates the manual steering angle of the steering wheel by using the signals detected by the steering angle sensor 102 and determines a correction current for an automatic steering angle adjustment based on the error between the manual steering angle of the steering wheel and the cooperative steering angle determined in Step 206. In other words, after determining the target steering angle, the EPS ECU 104 automatically varies the steering angles of the wheels by controlling the steering motor 106. To be more specific, the EPS ECU 104 is provided with real-time information on the current steering angles of the wheels and performs a feedback control on the steering angles of the wheels so that the current steering angle may be close to the target steering angle (Step 210).

Through the feedback controls by the EPS ECU 104, the wheels are automatically steered into a direction of a left or a right road, whichever has a lower frictional coefficient $\mu$. Accordingly, the yawing moment is reduced and the automobile can travel with a substantially linear movement.

As described above, the present invention provides a method for reducing a yawing moment of an automobile by automatically adjusting a steering angle according to a braking state of an automobile. Accordingly, the automobile can travel linearly even when the automobile brakes suddenly on a road surface where a left and a right tire of the automobile have different road frictional coefficient.

While the invention has been shown and described with respect to the preferred embodiments, it will be understood by those skilled in the art that various changes and modifications may be made without departing from the spirit and scope of the invention as defined in the following claims.

What is claimed is:

1. A method for operating an automobile electric power steering (EPS) system capable of selectively adjusting a steering angle depending on a braking state of an automobile, comprising the steps of:

making a decision about whether or not the automatic adjustment of the steering angle is performed based on a speed of the automobile due to the braking state and a rotational state of each wheel;

setting a cooperative steering angle to cooperate the braking state based on the speed of the automobile and decision about whether or not the automatic adjustment of the steering angle is performed;

determining a target steering angle for the automatic adjustment based on the cooperative steering angle and a manual steering angle of a steering wheel; and performing a feedback control on the cooperative steering angle such that the steering angle of said each wheel becomes close to the determined target steering angle.

2. The method of claim 1, further comprising the step of: shifting, if the automatic adjustment of the steering angle is performed, to a high-speed mode to increase steering effort.

3. The method of claim 1, wherein the speed of the automobile and the rotational state of each wheel are informed through an ABS operational state signal transmitted from an anti-lock brake system (ABS) electric control unit (ECU).

* * * * *